Patented July 2, 1935

2,006,589

UNITED STATES PATENT OFFICE 2,006,589

METHOD OF PURIFYING PHENOLS

Karl Henry Engel, West Englewood, N. J., assignor to The Barrett Company, New York, N. Y., a corporation of New Jersey No Drawing. Application March 5, 1934, Serial No. 714,093

11 Claims. (Cl. 260—154)

This invention relates to the purification of phenols and more particularly to the purification of commercial phenolic mixtures obtained from tar and suitable for use in the preparation of condensation products and for other uses wherever phenols or phenolic mixtures highly resistant to exposure to light and heat and capable of entering into condensation reactions without discoloration of the product are desirable. By the expressions "heat stability" and "light stability" I mean the ability of the material to remain uncolored or light in color upon extended exposure to heat or light; in other words, its resistance to color change.

Mono-hydroxy-phenols, such as phenol, meta- and para-cresols, xylenols, and the commercial mixtures of phenols, for example, crude tar-acids or tar-acid distillate fractions, may be purified in accordance with the present invention to produce phenols or phenolic mixtures of exceedingly desirable color and stability characteristics. Products may be prepared substantially water-white in color and capable of exposure to light for long periods without substantial discoloration. They are especially resistant to heat and produce formaldehyde resins that are exceedingly light in color. Because of their heat stability they are also well adapted for preparing phenolic derivatives the preparation of which involves the heating of a phenol to an elevated temperature, say 100° C. or above, as in the preparation of tricresyl phosphate.

In accordance with my invention the phenol to be purified is first subjected to a treatment comprising mild oxidation in a neutral or acid medium. By this treatment the poly-hydroxy-phenols, e. g., catechol, resorcinol, by hydroquinone, and their analogues and homologues are oxidized, whereas the mono-hydroxy-phenols are not. The phenol is then subjected to a reduction treatment so that oxidation products are converted to water-soluble sulfonates or sulfates or sulfites, which may be readily separated mechanically from the tar-acids. By my process the purity of the phenol and its resistance to light and heat are greatly improved.

The oxidation treatment may be carried out with any suitable oxidizing agent, for example, potassium permanganate, stannic chloride, hydrogen peroxide, air, or air and mineral acid combined, e. g., air and hydrochloric or sulfuric acid. I have found that the use of air and sulfuric acid gives exceedingly good results. Crude coal-tar phenols usually contain small amounts of nitrogen bases, such as pyridine, quinoline, and their derivatives, which also are very deleterious to the stability of the product. In the treatment of phenols containing such nitrogen bases, the sulfuric acid in addition to removing oxidizable impurities dissolves these bases.

The reduction treatment of the phenols may be carried out with various reducing agents, such as sulfurous acid and the sulfites or bisulfites of sodium, potassium, or ammonium. These sulfites seem to react with quinones to form sulfonates, sulfites, or sulfates which are water-soluble and therefore may be easily separated in the form of an aqueous solution from the relatively insoluble phenols. The separation may be effected mechanically as by decanting or by subjecting to centrifugal action. I have found the alkali-metal sulfites and bisulfites to be especially suitable for this purpose. Normal sulfites are not as readily removed from tar-acids by washing as are bisulfites and the bisulfites therefore are to be preferred.

The following examples will illustrate the preferred method of carrying out my process.

In order that the phenols purified in accordance with my invention may be more readily compared with the original phenols, I have shown the results of tests carried out upon both the crude and purified phenols to determine their stability towards heat and light and their ability to produce light-colored resins.

To determine the stability of the phenols to light, a glass stoppered bottle of 125 cc. capacity was half filled with the phenols to be tested and placed so as to be exposed to direct sunlight during the greater part of the day. The temperature was maintained around 30–40° C. The light stability is hereinafter designated in terms of the period of time required for an appreciable change from the original water white color of the phenol.

The stability to heat was determined by heating a 25 cc. sample of the material in a 125 cc. Erlenmeyer flask under reflux for a period of 15 hours at a temperature of 100–115° C. Heat stability is hereinafter designated in terms of the color resulting from this treatment.

To determine the color of formaldehyde resins produced from the original phenols and from the purified phenols, a mixture of 10cc. of the phenol with 22 cc. of C. P. formaldehyde (Merck) and one gram of 10% aqueous NaOH solution was brought quickly to a boil, and gently refluxed until turbidity appeared and two liquid layers separated. The mixture was then slightly acidified with lactic acid and the water was removed by vacuum distillation. The condensation product was then cured by maintaining it overnight at 80–100° C.

The colors of the original phenols, and purified phenols after subjecting them to the heat stability test, and the colors of the formaldehyde resin products are given in terms of a numerical color standard in which 1 represents pale yellow and fractional figures, as their numerical values diminish, represent correspondingly lighter shades, the fraction $\frac{1}{16}$ indicating a nearly colorless material.

The following examples illustrate the oxidation-reduction process.

*Example 1.*—A crude commercial tar-acid was obtained by extracting phenols from a commercial carbolic oil and acidifying the resultant aqueous sodium phenolate solution with carbon dioxide. The crude tar-acid contained 20% water and showed, after dehydration, the following Engler distillation characteristics:

| | |
|---|---|
| Initial | 175° C. |
| 10 cc. | 189 |
| 20 cc. | 191 |
| 30 cc. | 193 |
| 40 cc. | 195 |
| 50 cc. | 196.5 |
| 60 cc. | 199 |
| 70 cc. | 204 |
| 80 cc. | 211 |
| End point | 249 |

Pitch residue, 11% of initial dehydrated material.

When subjected to the tests above described the crude tar-acid exhibited the following properties:

| | |
|---|---|
| Color | Water white |
| Heat stability | 1 |
| Light stability | 4 days |
| Formaldehyde resin color | 1 |

The purification of this tar-acid was effected in the following manner:

To 10 parts by volume of the crude tar-acid in a glass container 1 part by volume of aqueous 30% sulfuric acid solution was added. Air was slowly bubbled up through the liquid at ordinary room temperature (around 20° C.) For five hours, the air serving to agitate and cause thorough admixture of the sulfuric acid with the tar-acid. After this aeration period the heavier aqueous liquid was mechanically separated from the phenolic portion.

To the phenolic or tar-acid portion 1 part by volume of aqueous sodium bisulfite solution (20% $NaHSO_3$) was added, and the resulting mixture was agitated for one hour at ordinary room temperature (around 20° C.) in order to secure thorough contact of the bisulfite solution with the tar-acids. The tar-acids were then mechanically separated from the aqueous solution and washed with one part by volume of water.

After this washing treatment the tar-acids were distilled at reduced pressure.

The distillate possessed the following physical characteristics:

| | |
|---|---|
| Color | Water white |
| Heat stability | Water white |
| Light stability | Seven days |
| Formaldehyde resin color | $\frac{1}{8}$ |

*Example 2.*—A commercial mixture of meta- and para-cresol had the following properties:

*Engler distillation characteristics*

| | |
|---|---|
| Initial | 195° C. |
| 10 cc. | 201 |
| 30 cc. | 201 |
| 50 cc. | 201 |
| 70 cc. | 201 |
| 90 cc. | 202 |
| End point (98%) | 204 |
| Color | Water white |
| Heat stability | $\frac{3}{8}$ |
| Light stability | 2 days |
| Formaldehyde resin color | $\frac{3}{4}$ |

Ten parts by volume of the meta-, para-cresol mixture were agitated in a glass agitator at room temperature with 1 part by volume of aqueous 30% $H_2SO_4$ solution. A slow air flow was blown through the mixture for five hours. After settling to separate the heavier sulfuric acid from the tar-acids, the sulfuric acid was drawn off and the tar-acids were agitated for one hour at room temperature with 1 part by volume of 20% aqueous sodium bisulfite ($NaHSO_3$) solution. The tar-acids were then mechanically separated from the sodium bisulfite solution and washed with 1 part by volume of water. The washed tar-acids were then distilled under vacuum. The distillate possessed the following characteristics:

| | |
|---|---|
| Color | Water white |
| Heat stability | Water white |
| Light stability | 6 days |
| Formaldehyde resin color | $\frac{1}{8}$ |

It will be apparent to those skilled in the art that the above examples are merely illustrative and that many variations in the above procedure may be made within the purview of the invention.

A product of even greater stability than those above described may be made by carrying out the sulfuric acid treatment as a separate step prior to the aeration treatment. The treatment of the crude tar-acids with sulfuric acid removes pyridine bases, if they are present, and also other impurities which are present dissolved in the tar-acids. Upon distillation of the tar-acids under vacuum after treatment with sulfuric acid a pitchy residue is obtained. The tar-acids thus freed from impurities represented by this pitchy residue may then be subjected to aeration and reduction as previously described, it being unnecessary in this case to have sulfuric acid present during the aeration. Because of the absence of the pitchy materials removed in the distillation step the subsequent purification is facilitated and an exceedingly stable product is obtained.

Prior to the final distillation the phenol or phenols may be subjected to a dehydration treatment in any well-known manner. Ordinarily, however, a sufficient separation of water is obtained by separately collecting the early distillate fraction, which will contain substantially all of the water.

It also may be advantageous to follow the sulfite treatment, where this method of reduction is employed, with an alkaline wash, for example with an aqueous 2% to 5% ammonium hydroxide wash instead of the final aqueous wash of the above examples. The presence of $SO_2$ is objectionable in tar-acids employed for the manufacture of casting resins and hence the removal of the last traces of $SO_2$ may be assured by washing with aqueous 2% to 5% $NH_4OH$ solution in this manner. The final product should, however, be free of ammonia as well as of $SO_2$ since the presence of ammonia reduces the stability of the phenols towards light. A redistillation under vacuum though unnecessary may be desirable in many cases in order to effect complete elimination of ammonia and produce phenols of the highest quality for the production of such condensation products. The following example illustrates the modified procedure embodying an alkaline wash:

*Example 3.*—10 parts of a crude commercial tar-acid of the same composition as that purified in Example 1, were subjected to an oxidation treatment in the same manner as set forth in that example. After separation of sulfuric acid from the treated tar-acid, the tar-acid was washed with 1 part by volume of an aqueous sodium carbonate solution (20% $Na_2CO_3$). In this manner the sulfuric acid present was neutralized. One part by volume of aqueous sodium sulfite solution (20% $Na_2SO_3$) was then added to the tar-acid and the resultant mixture was agitated for an hour at room temperature. At the end of an hour the agitation was terminated and the mixture was permitted to settle into an aqueous layer and a tar-acid layer. The tar-acid layer was mechanically separated from aqueous solution and washed with 1 part by volume of a dilute aqueous ammonium hydroxide solution (2% $NH_4OH$). After removal of the washing solution the tar-acid was distilled under vacuum. The tar-acid distillate possessed the following characteristics:

Color_____ Water white
Heat stability_____ $\frac{1}{16}$
Light stability_____ 4 days
Formaldehyde resin color_____ $\frac{1}{8}$ In the examples the oxidation treatment is described as carried out at ordinary room temperature. However, elevated temperatures or temperatures below room temperature may be employed when desired. Similarly in the reduction step reduction with sodium sulfite or sodium bisulfite was carried out in the examples at room temperature, but this treatment also may be carried out at either higher or lower temperatures. If sulfurous acid is employed as the reducing agent, the tar-acids during the reduction step are desirably maintained at room temperature or below, and with bisulfite much higher temperatures should be avoided.

In the vacuum distillations of the tar-acids in the examples an absolute pressure of 25 to 40 mm. of mercury was employed but higher or lower pressures may prevail during the distillation. The distillation is preferably carried out at as low a pressure as practicable in order to prevent decomposition of the monohydroxyphenols themselves during the purification process and also to prevent in so far as possible the breaking down of any oxidation-reduction products into volatile compounds that might be carried over with the tar-acids.

In the claims the terms "sulfite" and "aqueous sulfite" are intended to include sulfurous acid (i. e. hydrogen sulfite) and metal and ammonium sulfites; the terms "a sodium sulfite" and "an alkali-metal sulfite" are intended to cover not only the normal sulfites but the bisulfites and metasulfites as well. The term "phenol" is used in its generic sense to cover phenol and substituted phenols or mixtures thereof. The term tar-acid is used to indicate the phenols or phenol mixtures derived from coal distillation gases and normally recovered by alkaline extraction of coal-tar distillates. Such crude phenols usually contain characteristic impurities such as nitrogen bases that may or may not be present in synthetically prepared phenols.

I claim:

1. The method of purifying a monohydroxyphenol containing impurities which are more susceptible to oxidation than the monohydroxyphenol, which comprises subjecting the phenol to a mild oxidation treatment whereby said impurities are oxidized thereafter subjecting it to the action of a reducing agent, and separating the monohydroxyphenol from the reaction product.

2. The method of purifying a monohydroxyphenol containing impurities which are more susceptible to oxidation than the monohydroxyphenol, which comprises treating the phenol with a mild oxidizing agent, whereby said impurities are oxidized, thereafter treating it with a reducing agent so as to form water-soluble compounds from the oxidation products, and mechanically separating from the monohydroxyphenol the oxidation-reduction reaction products as an aqueous solution.

3. The method of purifying a monohydroxyphenol containing a polyhydroxyphenol, which comprises subjecting the phenol to a mild oxidation treatment insufficient to substantially affect the monohydroxyphenol but sufficient to oxidize the polyhydroxyphenol present, thereafter treating the phenol with an aqueous sulfite so as to form a water-soluble compound from the oxidation product, and mechanically separating the resultant aqueous solution from the monohydroxyphenol.

4. The method of purifying a monohydroxyphenol containing impurities which are more susceptible to oxidation than the monohydroxyphenol, which comprises areating the phenol, whereby said impurities are oxidized, treating the aerated product with an aqueous sulfite, mechanically separating the aqueous solution from the monohydroxyphenol, and subjecting the phenol thus purified to vacuum distillation.

5. In the purification of a crude tar-acid, the method which comprises treating the tar-acid with a mineral acid and subjecting the tar-acid to oxidation by means of air, and subsequently treating the aerated tar-acid with a sulfite.

6. The method of purifying a crude tar-acid, which comprises mixing the tar-acid with an aqueous mineral acid solution, passing air into contact with the mixture so as to oxidize impurities present in the tar-acid, treating the aerated tar-acid with an aqueous sulfite so as to form a water-soluble compound from the reaction product of the tar-acid impurities, and mechanically separating the resultant aqueous solution from the tar-acid.

7. The method of purifying a crude tar-acid, which comprises mixing the tar-acid with an aqueous mineral acid solution, passing air into the mixture so as to agitate the mixture and oxidize impurities present in the tar-acid, separating the tar-acid from the aqueous acid solution, treating the separated tar-acid with an aqueous alkali-metal sulfite, mechanically separating the resultant aqueous solution from the tar-acid, and subjecting the tar-acid to vacuum distillation.

8. The method of purifying a crude tar-acid, which comprises mixing the tar-acid with an aqueous sulfuric acid solution, passing air into the mixture so as to agitate the mixture and oxidize impurities present in the tar-acid, separating the tar-acid from the aqueous acid solution, treating the separated tar-acid with an aqueous sulfite, mechanically separating the resultant aqueous solution from the tar-acid, and subjecting the tar-acid to vacuum distillation.

9. The method of purifying a crude tar-acid, which comprises treating the tar-acid with aqueous sulfuric acid solution, separating the aqueous solution from the tar-acid, and distilling the tar-acid aerating the resultant tar-acid distillate to oxidize impurities, treating the aerated distillate with an aqueous sulfite solution, and mechanically separating the aqueous solution from the tar-acid.

10. The method of purifying a crude tar-acid, which comprises mixing the tar-acid with an aqueous sulfuric acid solution, bringing air into intimate contact with the mixture so as to oxidize impurities present in the tar-acid, separating the tar-acid from the aqueous acid solution, treating the tar-acid thus separated with an aqueous solution of a sulfite, mechanically separating the tar-acid from the aqueous solution, and washing the separated tar-acid with a weak aqueous ammonium hydroxide solution.

11. The method of purifying a crude tar-acid, which comprises mixing the tar-acid with an aqueous sulfuric acid solution containing about 30% $H_2SO_4$, bubbling air through the mixture so as to agitate it and oxidize impurities present in the tar-acid, mechanically separating the tar-acid from the aqueous solution, mixing the tar-acid thus separated with an aqueous solution of sodium bisulfite, mechanically separating the tar-acid from the aqueous sulfite solution, washing the separated tar-acid with a weak ammonium hydroxide solution, and subjecting the washed tar-acid to vacuum distillation.

KARL HENRY ENGEL.